US007359360B2

(12) United States Patent
Rönneke

(10) Patent No.: US 7,359,360 B2
(45) Date of Patent: Apr. 15, 2008

(54) COMMUNICATION SYSTEM SUPPORTING WIRELESS COMMUNICATION OF PACKET DATA AND METHOD AND ARRANGEMENT RELATING THERETO

(75) Inventor: Hans Rönneke, Kungsbacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 840 days.

(21) Appl. No.: 10/398,862

(22) PCT Filed: Oct. 11, 2001

(86) PCT No.: PCT/SE01/02210

§ 371 (c)(1),
(2), (4) Date: Oct. 14, 2003

(87) PCT Pub. No.: WO02/32062

PCT Pub. Date: Apr. 18, 2002

(65) Prior Publication Data

US 2004/0053607 A1    Mar. 18, 2004

(30) Foreign Application Priority Data

Oct. 13, 2000  (SE) .................................... 0003719

(51) Int. Cl.
*H04Q 7/24* (2006.01)
(52) U.S. Cl. ...................... 370/338; 370/400; 370/310; 370/352; 370/328; 370/379; 370/466; 709/228; 709/226; 709/201; 709/225; 714/4; 714/7; 455/445; 455/560
(58) Field of Classification Search ................ 370/338, 370/400, 328, 379, 466; 709/228, 201, 226; 455/445, 560, 426.1
See application file for complete search history.

(56) References Cited

U.S. PATENT DOCUMENTS

| 5,721,914 | A | * | 2/1998 | DeVries ........................ 707/10 |
| 5,831,975 | A | * | 11/1998 | Chen et al. .................. 370/256 |
| 5,970,059 | A | * | 10/1999 | Ahopelto et al. ........... 370/338 |
| 6,088,330 | A | * | 7/2000 | Bruck et al. ................. 370/228 |
| 6,104,929 | A | * | 8/2000 | Josse et al. .................. 455/445 |
| 6,122,276 | A | * | 9/2000 | Boe et al. .................... 370/389 |
| 6,128,277 | A | * | 10/2000 | Bruck et al. ................. 370/221 |

(Continued)

FOREIGN PATENT DOCUMENTS

WO        WO 98/59505      12/1998

(Continued)

OTHER PUBLICATIONS

M. Fyro, et al., "Media Gateway for Mobile Networks", Ericsson Review, vol. No. 4, 2000.

(Continued)

*Primary Examiner*—Marceau Milord

(57) ABSTRACT

A communication system supporting communication of packet data. It comprises a core network, which includes a number of packet data support nodes, a number of gateway nodes for communication with external packet data networks, and a number of radio networks. Each radio network includes radio network control means. At least some of the packet data support nodes include a separate functional server node. A number of the functional server nodes are provided to control at least a number of radio network control means such that the functional server nodes are able to control any radio network control means.

20 Claims, 9 Drawing Sheets

U.S. PATENT DOCUMENTS

| | | | | |
|---|---|---|---|---|
| 6,141,325 A * | 10/2000 | Gerstel | | 370/238 |
| 6,178,160 B1 * | 1/2001 | Bolton et al. | | 370/255 |
| 6,374,112 B1 * | 4/2002 | Widegren et al. | | 455/452.2 |
| 6,463,064 B1 * | 10/2002 | Broockman et al. | | 370/401 |
| 6,529,497 B1 * | 3/2003 | Hjelm et al. | | 370/347 |
| 6,621,793 B2 * | 9/2003 | Widegren et al. | | 370/230.1 |
| 6,627,793 B2 * | 9/2003 | Sarhan et al. | | 370/230.1 |
| 6,735,220 B1 * | 5/2004 | Shirriff | | 370/475 |
| 6,845,100 B1 * | 1/2005 | Rinne | | 370/395.43 |
| 6,850,759 B2 * | 2/2005 | Van Lieshout et al. | | 455/426.1 |
| 6,889,050 B1 * | 5/2005 | Willars et al. | | 455/452.2 |
| 6,898,433 B1 * | 5/2005 | Rajaniemi et al. | | 455/456.1 |
| 6,920,116 B1 * | 7/2005 | Hossain et al. | | 370/329 |
| 6,931,448 B2 * | 8/2005 | Holler et al. | | 709/227 |
| 6,950,398 B2 * | 9/2005 | Guo et al. | | 370/235 |
| 6,973,054 B2 * | 12/2005 | Bjelland et al. | | 370/310 |
| 6,973,057 B1 * | 12/2005 | Forslow | | 370/328 |
| 6,996,081 B1 * | 2/2006 | Brouwer | | 370/335 |
| 7,031,718 B2 * | 4/2006 | Jouppi et al. | | 455/450 |
| 7,072,329 B2 * | 7/2006 | Willars et al. | | 370/352 |
| 7,106,718 B2 * | 9/2006 | Oyama et al. | | 370/340 |
| 7,126,939 B2 * | 10/2006 | Barany et al. | | 370/352 |
| 7,180,860 B2 * | 2/2007 | Fonden et al. | | 370/235 |
| 7,191,231 B2 * | 3/2007 | Miernik et al. | | 709/225 |

FOREIGN PATENT DOCUMENTS

| WO | WO 00/21319 | 4/2000 |
|---|---|---|
| WO | WO 01/01718 | 1/2001 |

OTHER PUBLICATIONS

U.S. Appl. No. 60/152,748, filed Sep. 9, 1999, Hans Ronneke, et al.

* cited by examiner

COMMUNICATION SYSTEM SUPPORTING WIRELESS COMMUNICATION OF PACKET DATA AND METHOD AND ARRANGEMENT RELATING THERETO

BACKGROUND OF THE INVENTION

The present invention relates to wireless communication systems supporting communication of packet data which include a core network and a number of radio networks, and particularly it relates to the control of radio networks, e.g. via radio network control means, by packet data support nodes of the core network. The invention also relates to a packet data support node in a communication system supporting communication of packet data and to a method of controlling, in a communication system supporting communication of packet data, connections between user stations and/or connections between user stations and external packet data networks.

BRIEF SUMMARY OF THE INVENTION

In communication systems supporting communication of packet data including a number of radio networks and a core network, e.g. a PLMN, each radio network generally comprises radio network control means comprising one or more radio network control nodes controlling a number of base stations to which user stations can be connected or attached. Generally a radio network control means or a radio network control node is controlled by a packet data support node of the core network. For GPRS/UMTS such a packet data support node is denoted an SGSN (Serving GPRS Support Node). Another support node in such a communication system is the GGSN (Gateway GPRS Support Node) which handles or controls communication with external packet data networks. In systems known today SGSN, or more generally the packet data support node, controls one or more radio network control means, i.e. it is responsible for such radio network control means, for example RNCs. It is fixed which SGSN controls which RNC(s).

It has been suggested to split up a packet data support node, or particularly an SGSN, in two "sub-nodes", namely an SGSN server and another sub-node denoted media gateway (MGW) wherein the SGSN server node handles control plane functionalities and the media gateway handles user plane functionalities. However, redundancy issues constitute a problem in such a system since if an SGSN (or an SGSN server node) is malfunctioning, another SGSN has to be allocated or a redundant SGSN has to be provided for. Generally, as a subscriber performs an attach procedure to the network, the RNC controlling the base station it connects to, allocates a nearby SGSN (or SGSN server), i.e. which SGSN that is selected is generally based on the location of the subscriber.

This gives rise to problems also as far as load sharing is concerned, which generally is not handled in any satisfactory manner. As an example, at rush hours a large number of subscribers move in the same direction, i.e. towards the center of a town and, since the selection of SGSN server is location dependent, i.e. it depends on which radio network the subscriber has attached to, the SGSN servers in such areas run the risk of being overloaded whereas other SGSN servers are hardly used at all. At a later time the situation may be the opposite, i.e. the previously hardly loaded SGSNs will be heavily loaded whereas the others will have a lot of spare capacity. This means that the SGSNs (or SGSN servers) have to be dimensioned for the "worst case".

Moreover, as a subscriber is roaming within the network such that the closest base station will be controlled by another radio network control means, than the one he attached to, and hence the SGSN which is responsible for a particular radio network control means is statically configurated, the responsibility for the connection will be taken over by another SGSN (server) etc. This involves a lot of signalling e.g. with the home location node (HLR) of the subscriber, i.e. it requires HLR updates which means a load on the HLR and it involves a lot of signalling. To make reconfigurations and to add equipment in such a system will also involve high costs and much complicated configurational work. Still further high costs are involved when such a system needs to be built out, i.e. when new servers or servers with a greater capacity, or servers replacing malfunctioning servers need to be added. Consequently, the known solutions are disadvantageous as far as load sharing is concerned and moreover, packet data support node redundancy is not provided for to a sufficient extent, network configuration work is expensive, time consuming and complicated. In addition thereto packet data support nodes are associated with specific radio network control means which means that, for a roaming subscriber, the responsibility for such subscriber by a packet data support node will be transferred to other packet data support nodes as the subscriber moves throughout the network. This leads to a lot of signalling between packet data support nodes and home location nodes of the subscriber in order to update involved nodes (HLR-nodes, SGSN-SGSN, SGSN-GGSN) which puts a high load on e.g. the home location node and requires a lot of signalling in general. This problem may of course be even more serious from a network point of view if, at a given time, a plurality of subscribers moves substantially along the same path, cf. rush hour traffic.

SUMMARY OF THE INVENTION

What is needed is therefore a communication system supporting communication of packet which system is of a kind that comprises a core network with a number of packet data support nodes (and gateway nodes for communication with external packet data networks), a number of radio networks controlled by radio network control means wherein the load on packet data support nodes can be distributed in an appropriate manner, or in other words is capable of providing for an adequate load sharing among the packet data support nodes and in which the load of the packet data support nodes gets as independent of time as possible or at least distributed as evenly as possible among the packet data support nodes.

A communication system is also needed in which packet data support node redundancy can be provided for in an easy and straightforward manner. Still further a system is needed in which configurational work and development of packet data support nodes can be handled as easily, and efficiently as possible, for example in the case of malfunctioning nodes, introduction of additional equipment or particularly addition of entire packet data support nodes etc. Further yet a system is needed in which operation and maintenance, especially as far as packet data support nodes is concerned, can be provided for in a cost efficient, easy and fast manner. Still further a system is needed through which the signalling relating to controlling packet data support node can be reduced as well as the load on home location nodes for subscribers moving throughout the network, for example as far as home location node updates relating to such subscribers can be reduced as compared to in hitherto known systems.

Therefore the present invention provides for a communication system as referred to above in which at least some of the packet data support nodes are divided into a functional server node (FSN) and a functional user gateway node (UGN) Alternatively the functional server node functionality, i.e. the control plane functionalities, of a number of packet data support nodes, i.e. functional server nodes, are provided in a pool; no functional user gateway nodes being provided. A number of functional server nodes are provided to, in common, control at least a number of routing areas served by different radio network control means. These functional server nodes are arranged to form a pool of functional server nodes and each of the functional server nodes in a said pool is able to control any of the radio network control means.

In a particularly advantageous implementation all functional server nodes are included in a pool which is common for the entire network, i.e. all radio networks. Any functional server node may then serve any radio network control means. Of course there may also be for example two or more different pools wherein the functional server nodes of a pool commonly are responsible for a part of the network whereas the remainder of the radio network control means commonly are controlled by the functional server nodes of the other pool.

A number of functional server nodes may be located at a first server site whereas other functional server nodes of the same pool may be located at a different server site to provide for, in addition to functional server redundancy also server site redundancy, thus increasing the server node redundancy even more. It is of course also not necessary to provide one or two sites but the functional server means can be arranged in any appropriate manner. It is however particularly advantageous to gather a plurality of functional server nodes at at least one site, or two or more, if redundancy is considered to an even higher extent.

In a particular implementation the communication system comprises a PLMN (Public LAN Mobile Network) which thus comprises a core network and a number of radio networks. In an advantageous implementation all functional server nodes are able to serve the entire PLMN. A radio network control means may particularly comprise one or more radio network control nodes for that specific radio network controlling a plurality of base stations. The radio network control nodes communicate with an allocated or selected functional server node over a control plane sub-protocol and with the user gateway node over a user plane sub-protocol. This means that, to allow the split up of the packet data support node, a protocol has to be used which can be divided into a control plane sub-protocol and a user plane sub-protocol between the packet data support node and the radio network. However, also if there is not such a protocol, the inventive concept may be implemented but then all communication goes via an UGN which forwards control signalling to the FSN. Such a concept is described in the Provisional U.S. patent application Ser. No. 60/152,748 filed on Sep. 9, 1999 by the same applicant, and with the title "Method, apparatus and system for enabling communication between second generation and third generation packet data networks" and the content of which herewith is incorporated herein by reference. This application was followed up by a regular patent application based thereon.

Particularly the system comprises GPRS/UMTS and the packet support nodes are SGSN nodes (serving GPRS support nodes) which here are divided into functional server nodes (and functional user gateway nodes). The user gateway nodes, if implemented, particularly comprise so called media gateways (MGW). The radio networks are so called UTRANs and the radio network control means of such an UTRAN comprises one or more RNCs. Each subscriber or user (equipment) station (UE or US) having initiated an attach procedure to the network is allocated a functional server node independently of the location of the user equipment station, i.e. any functional server node may be selected, and said allocation is also unaffected by the user station moving throughout the network, if roaming around in the network. As long as the user is attached or connected, the same (selected) functional server node may be responsible for the control, of course unless it is subjected to a malfunction or similar. In a particular implementation the allocation of a functional server node for a subscriber or a user station is maintained at least for a given time interval or alternatively as long as the subscriber is attached to the network.

In an advantageous implementation a functional server node remains responsible for a particular subscriber having been allocated the functional server node also when the subscriber has performed a detach procedure. Information about which was the allocated functional server node for that particular subscriber may be stored in storing means in the radio network control means such that when the subscriber again initiates an attach procedure, the same functional server node may be reused for that subscriber. It is the radio network control means that are responsible for allocating a functional server node, or for a selecting a functional server node, for a subscriber performing an attach procedure to get attached to the network.

A radio network control means may allocate or select a functional server node in different ways. In one implementation consecutive subscribers which are attaching/connecting to the network over a particular radio network control node, are allocated different functional server nodes which means that the radio network control means selects different functional server nodes for consecutively connecting or attaching subscribers. This can also be done in different manners, consecutive subscribers can be allocated different functional server means according to any given scheme or in any given order. It is also possible to randomly select a functional server means for each subscriber. Then may of course two consecutive subscribers be allocated the same functional server node; however, this is not important since in principle it is not necessary that consecutive subscribers actually are allocated different functional server means. In an alternative implementation subscribers groupwise are allocated functional server means such that for example five subscribers may be allocated a first functional server means, the next group of subscribers may be allocated another functional server means etc. This is not a critical issue, the main thing being that the selection or allocation of functional server means remains at least as long as the subscriber is attached, i.e. that it is not dependent on the location of a radio network control means but that the load from each radio network control means can be evened out among the functional server means such that a good load sharing is provided as well as redundancy. It is an efficient means to handle an uneven load in the network, cf. the situation initially referred to when a lot of subscribers at the same time move in the same direction etc. or when a large amount of subscribers at the same time are at the same place etc.

In a particular implementation each functional server node includes a functionality for selecting functional user gateway node for each subscriber for which the particular functional server node has been selected. The functional server node may select an optional functional user gateway node for a subscriber or, alternatively, a functional server node has to select a user gateway node that is close to the subscriber, or according to a given scheme or algorithm. Also this can be done in any appropriate manner. Further still, advantageously the functional server node is responsible for selecting packet data gateway support node for communication with external packet data networks. This can also be done in different manners.

The invention also provides for a packet data support node for mobility and session management in a communication system supporting communication of packet data. The packet data support node is divided into a functional server node and a user gateway node, or comprises at least a (separate) functional server node. The functional server node forms part of a pool of functional server nodes and, in common with said other functional server nodes, it is able to serve at least a given part of the communication system, i.e. at least a number of routing areas or a number of radio networks, particularly radio network control means controlling a number of different radio networks. This means that said functional server node is responsible for all radio network control means within the given part of the network.

In one implementation all functional server nodes in the pool are responsible for the entire network which means that the functional server node itself shares the responsibility for all radio network control means with all other functional server nodes and that it can be selected or allocated by any of the radio network control means. The functional server node particularly comprises means for selecting a user gateway node for a subscriber (connection) to which it has been allocated as a functional server node or, in other words, for which it has been selected by the radio network control means controlling the base station serving the subscriber or the user station of the subscriber.

The action of selecting a user gateway node can be performed in different ways. In one implementation a user gateway node can be selected freely. In an alternative embodiment the selection can be done according to some given requirements. In a particular embodiment the user gateway node closest to the subscriber having initiated an attach procedure should be "selected"; other criterias are however also applicable and any such selection model is intended to be covered by the scope of the present invention. In a particular implementation the packet data support node is an SGSN of the GPRS/UTMS system which is divided into a functional server node (SGSN server) and a user gateway node wherein the user gateway node comprises a so called media gateway. Particularly the functional server node is responsible for the selection of a user gateway node or a MGW. In one implementation the selection can be done mor or less freely and in an alternative implementation the MGW closest to the radio network control means should be "selected". Also other selection procedures are possible.

The invention therefore also discloses a method, in a communication system, comprising a core network and a number of radio networks, and which supports communication of packet data, for controlling connections between user (equipment) stations and/or between user (equipment) stations and external packet data networks, wherein user stations are connected to radio networks each of which is controlled by a radio network control means and wherein packet data support nodes are provided for radio network control. According to the invention a packet data support node is divided into a functional server node and a user gateway node for control plane applications and user plane applications respectively. The method includes the steps of; providing a pool of functional server nodes; commonly controlling at least a part of the network by said functional server nodes such that any functional server node in the pool may control any connection irrespectively of in which radio network the user station is located.

In a particular implementation the method includes the steps of; selecting, arbitrarily or according to a given scheme, a functional server node for a subscriber having initiated an attach procedure to the network; maintaining said functional server node for said subscriber/the user station irrespectively of where in the network the subscriber is. Advantageously the method includes the steps of; selecting different functional server nodes for consecutive subscribers performing a network attach procedure over a particular radio network. The selection of functional server node is performed by the radio network control means controlling the radio network to which a subscriber attaches. The method particularly also includes the steps of; selecting a user gateway node from the allocated or selected functional server node; selecting a gateway support node for access to external packet data networks also from the allocated functional server node.

Thus, in an advantageous implementation, when a functional server has been selected and a subscriber has performed an attach procedure and during a PDP-context request procedure the functional server node selects a user gateway node which also can be done in any manner but in an advantageous implementation a user gateway node close to the radio network control means, i.e. to the subscriber, is selected.

The functional server node also is responsible of selecting a gateway support node for access to external packet data networks. Generally each radio network control means contains information about which are the functional server nodes and, for example, for each subsequent subscriber connecting to the network, a different functional server means is selected e.g. according to a rolling scheme, this may however be done in many different ways and the main point is that not all subscribers connecting or attaching via a particular radio network control means are allocated the same functional server node and moreover that a functional server node is kept even if the subscriber moves throughout the network and hence the signalling load is reduced and it is avoided that the home location node or HLR of the subscriber continuously has to be updated. In one embodiment, storing means are provided in the radio network control means for, at least for a given time period, storing information about which was the most recently selected functional server node for a particular subscriber who has become detached from the network such that upon reattachment to the network, the same functional server node may again be selected for that subscriber.

In different implementations the control plane functionality of a packet data support node is provided in one or more pools as discussed above and no user gateways for user plane functionalities are implemented but there is a direct tunnel from radio network control means to a packet data gateway support node (e.g. GGSN).

BRIEF DESCRIPTION OF THE DRAWINGS

The invention will in the following be further described in a non-limiting manner and with reference to the accompanying drawings, in which.

DETAILED DESCRIPTION OF THE INVENTION

Figure 1:
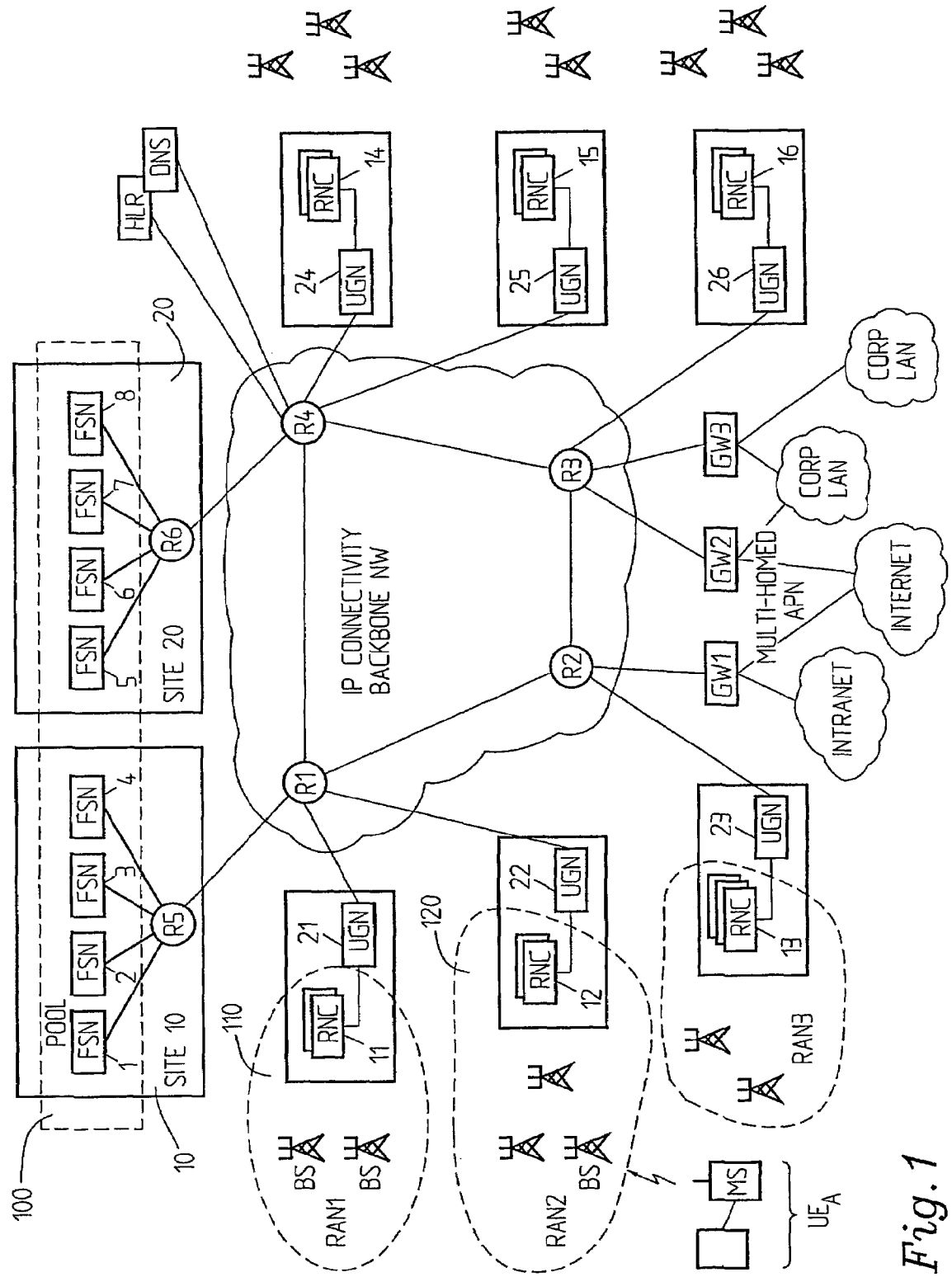
FIG. 1 schematically illustrates a communication system with a pool of functional server means.

FIG. 1 shows one way of implementing the inventive concept. A communication system supporting communication of packet data is disclosed. It comprises an IP connectivity backbone network and a number of radio networks RAN1, RAN2, . . . , RAN6 (of which only RAN1-RAN3 are explicitly indicated in the Figure). Each radio network comprises a number of base stations BS which are controlled by radio network control means RNC 11, . . . , RNC 16 respectively. In the figure user equipment station $UE_A$ is illustrated which e.g. comprises a computer connected to a mobile station $MS_A$ which here connects to RAN2. Packet data support node functionality is provided by functional server nodes FSN and user gateway nodes UGN respectively. Thus, a number of decomposed packet data support nodes are provided as FSN 1-FSN 8 and UGN 21-26.

The functional server nodes FSN 1, . . . , FSN 8 are provided in a pool 100 and they share the responsibility for the control of, here, all the radio networks RAN1, . . . , RAN6 meaning that any FSN of the pool is able control any of the radio networks. In this embodiment the functional server nodes are provided at two different sites, site 10 and site 20 respectively, for redundancy reasons, which is clearly advantageous for example if one site for one reason or another is destroyed for example due to fire or sabotage. Of course there may be more than two sites and it is of course also possible to keep all the functional server means at a single site as well. Other alternatives are also possible. Thus, in this embodiment FSN 1, . . . , FSN 4 are provided at site 10 whereas FSN 5, . . . , FSN 8 are provided at site 20. It should be noted that in this case all the functional server nodes are provided in a common pool. It is also possible to have more than one pool depending for example on geographical and practical considerations. FSN 1, . . . , FSN 4 are connected to router R5 which in turn is connected to router R1 of the backbone network which is in direct or indirect communication with the other routers of the backbone, here R2,R3,R4. In a similar manner FSN 5, . . . , FSN 8 are connected to router R6 at site 20 which in turn communicates directly with router R4 of the backbone network. The routers on the links of the backbone network as well as routers at the respective sites may be arranged in any appropriate manner. It is also possible to provide for redundant routers and links in the backbone network.

Packet data gateway support nodes GW1,GW2,GW3 are provided for connection to external packet data networks such as Internet, intranets and corporate LANs. The connection to an external network can be done through one or more GW:s. If there are more than one gateway to an external network a selection of gateways is needed at each connection activation. The home location register HLR and domain name server DNS are connected to connectivity backbone via router R4, but they can of course be connected in any other appropriate manner.

The radio network control means RNC 11, . . . , 16 are responsible for selecting a functional server node when a subscriber connects/attaches to the network. Thus, when user equipment $UE_A$ initiates an attach or connect procedure to be attached to the network via a base station of RAN2, RNC 12, which controls RAN2, is responsible for selecting a functional server node FSN. In principle RNC 12 may select any of the FSNs of pool 100 to control the subscriber of user equipment $UE_A$. It is here supposed that RNC 12 selects FSN 3. Advantageously the selection of FSN is done taking load sharing, FSN status etc into consideration. The selection can be performed in different ways, for example a Weighted Round-Robin WRR selection method with reject possibility may be used. This generally means that for each connection or attachment, another or the subsequent FSN is selected, i.e. for the next connecting subscriber, RNC 12 would select for example FSN 4. A weighting factor in a WRR selection method may be a factor which takes the capacity (configured capacity) of each FSN server into account. The actual load on the FSN can also be included in the weighing factor as other factors as well. An FSN server may be provided with the possibility of rejecting a request by an RNC and then the RNC will try another FSN server node. In an advantageous implementation the selection method also includes the possibility to return information in a reject message, e.g. the cause for the rejection, the current load status of the concerned functional server node etc. Advantageously each RNC keeps information about the status of the different FSN servers and inputs this to the selection algorithm.

In a particularly advantageous implementation an RNC keeps information about which FSN server a user equipment station has previously used. This information can then with advantage be used when a detached user reattaches and the FSN be reused. In that manner signalling is reduced or minimized and there is no need to get information about the old context in the old FSN server. It may also be used if the bearer on the used communication protocol has been temporarily released and then it is needed when the bearer is to be setup again. However, the information stored in an RNC is only kept for a given time period, otherwise the storing capacity would have to be unnecessarily high and too old information is generally not useful.

In one embodiment statistics relating to the number of rejects or reasons for rejections etc. by different FSN's is kept in the RNC:s. It is also possible to keep such information in an FSN or in both RNC and FSN. The information can be used to indicate which is the capacity and to trigger a capacity increase. Which FSN is allocated or selected for a particular subscriber or user station, is independent of where in the network the subscriber is, and no change of FSN is needed if the subscriber or user station moves to other routing areas or radio networks but the same FSN server may be kept. This means that no inter-functional server node Router Area update is needed which in turn will have as a consequence that less signalling than in hitherto known systems is needed and no HLR updates are required for such purposes. The by FSN temporarily assigned user station (UE) identity (P-TMSI) (which is stored in the user station at detach and power off) can be used to find the previously used FSN in case a user has moved to another RNC. Different ways to code FSN into user station identity can be used, e.g. by some bits identifying FSN etc.

Since all FSN servers have substantially the same or identical configuration, the operation and maintenance costs will be low, much lower than in hitherto known systems and it also makes it easier to add more capacity e.g. through adding a new FSN. The parameter and software configurations of the FSN:s are advantageously more or less identical. The hardware configuration may of course be different, capacity may differ etc.

If there are more than one pool serving the network, then all FSN:s within a pool particularly have identical parameter and SW configuration. Since there are always alternative FSN:s that can be used if a complete node fails, redundancy on network level is obtained and the redundancy requirements on the FSN will not be as stringent as the requirements on server nodes/packet data support nodes in hitherto known systems. When the packet data support nodes are divided into two functional nodes, the functional server nodes generally handle the control plane functionalities whereas the user gateway nodes handle the user plane functionalities. This will be further described with reference to FIG. 2 below which is a figure similar to that of FIG. 1 but specifically showing an UMTS-implementation.

In an advantageous embodiment, when an RNC has selected a functional server node FSN for a user station or a subscriber attaching to the network, the allocated or selected FSN is responsible for selection of a user gateway node. Particularly each FSN server within a pool can communicate with any user gateway node UGN in the network (or the part controlled by the pool), and each user gateway node UGN can be used by any functional server node FSN in the network of the pool. According to one implementation the FSN "selects" the UGN connected to the RNC it communicates with; i.e. by which it was selected. (Then there is a 1:M relationship between user gateway node UGN and radio network control means RNC.)

In an alternative implementation FSN selects UGN in a more free manner. In one implementation an algorithm is used according to which the nearest UGN is tried first. Then there is a M:N relationship between UGN and RNC. This is advantageous in so far that it also provides for UGN redundancy. Particularly the UGN closest to the concerned RNC should be selected first to minimize backbone capacity usage and if this UGN is not available or if it rejects the request, another UGN is selected. In one particular implementation, in case of a reject, a weighted Round-Robin algorithm may be used to select an alternative UGN. If UGN is selected without restrictions, at least to some extent, or if more than one UGN is selectable, this provides for redundancy on a network level as far as functional user gateway nodes are concerned and there will always be alternative UGN that can be used if a complete UGN fails. The redundancy requirements on such nodes will also be less stringent. It is also advantageous in that upgrading operations are facilitated e.g. when one UGN node is taken out of traffic. Still further, in one implementation it could be an option to use the same UGN until deactivation or detachment.

Still further, in one implementation the selected functional server node is responsible for selecting between several gateway nodes to external packet data networks such as for example Internet or an intranet for multi-homed APNs (Access Point Name). According to different embodiments the nearest gateway node is selected first or alternatively some algorithm is used such as the already mentioned weighted Round-Robin algorithm. In one particular implementation load and/or capacity considerations are included in the algorithm. Thus it can be provided for redundancy on network level also as far as gateway node to external network is concerned. There will always be alternative nodes to use if a complete gateway node fails and redundancy requirements will be less stringent on such nodes than in known systems. It will also for such nodes be easy to upgrade them e.g. by taking nodes out of traffic etc.

Figure 2:
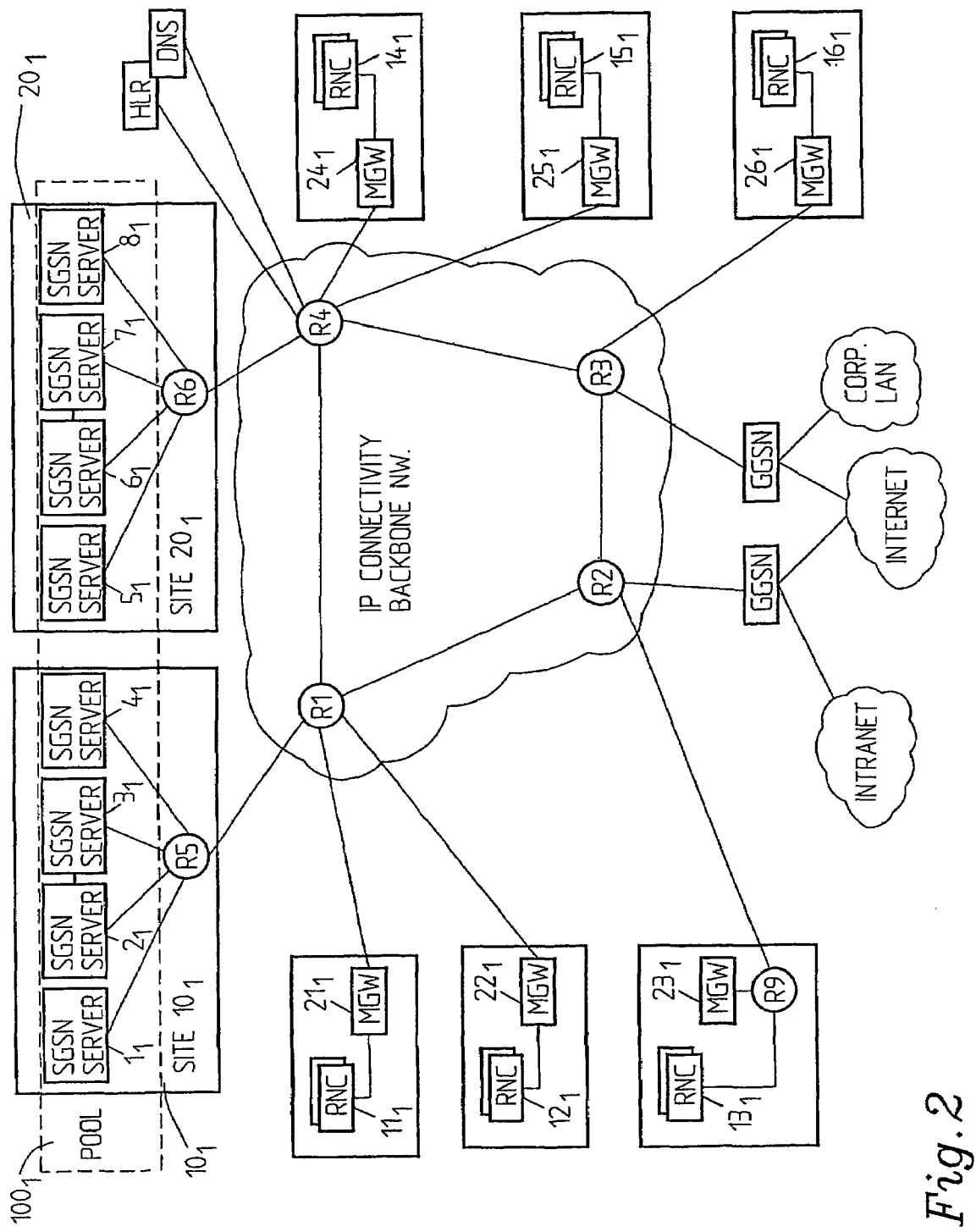
FIG. 2 is a figure similar to that of FIG. 1 wherein a communication system comprising GPRS/UMTS comprises a number of functional server nodes consisting of SGSN server nodes and user gateway nodes comprising media gateways.

FIG. 2 shows an implementation of the inventive concept to UTMS. Packet data support nodes here comprise SGSNs (Serving GPRS Support Node) and they are divided or decomposed into an SGSN server node and a media gateway (MGW). In other aspects this figure is similar to FIG. 1 and SGSN server nodes $1_1, \ldots, 8_1$ are located at two different sites $10_1, 20_1$ and all form part of a common pool 100. However, in this figure media gateway $23_1$ is connected to router R9 which is in connection with RNC $13_1$ of the radio network and with router R2 of the IP backbone network. In this way redundant MGWs are implemented. A corresponding router can be connected to the other MGWs as well (cf. FIG. 3). The concept of providing redundant user gateway nodes was more thoroughly described above but here the specifically implementation of an UGN in the form of a media gateway MGW is shown. For concepts, terminology etc. that is used it is referred to 3GTS 23.060 v3.4.0 (2000-07), Technical Specification by $3^{rd}$ Generation Partnership Project (3GPP™) which herewith is incorporated herein by reference.

In the following the decomposition or splitting up of an SGSN node into an SGSN server and a media gateway MGW will be more thoroughly explained. An SGSN normally handles a large part of user and control plane functions. When split up, the SGSN server node will handle all the signalling interfaces (Gs,Gr,Gd etc.) as well as the GTP-C protocol whereas the MGW will handle the user traffic, and in particular the GTP-U protocol. Thus the load, in the state of the art, supported by the SGSN, will be distributed over two different network elements, SGSN server node and MGW. A new interface is introduced between SGSN server node and MGW, however, this will require some additional processing and signalling but this will be quite insignificant and almost entirely offset by the general advantages provided for through the split-up. In a particular implementation the functions of the SGSN server node will be session management, mobility management, GTP-C termination, MAP termination, RANAP termination, CDR handling, media gateway selection, GGSN-selection, provision of intercept related information. The protocols referred to above, GTP-C, GTP Control Plane, GTP meaning GPRS Tunneling Protocol, MAP, RANAP (Radio Access Network Application Protocol) are discussed in 3GPP, 3G TS 23.060 v3.4.0 (2000-07).

The media gateway node will include the functionalities of GTP-U (GTP User Plane) termination, collection of usage information for charging and network surveillance purposes, reporting of usage information on demand or event to the SGSN server node or other nodes, provision of content of communication etc.

The SGSN server node may control the MGW through the Mc interface following the ITU-T H.248/IETF MEGACO Standard and GGSN through the Gn interface by means of GTP-C messages. GTP-U packets are transferred between the MGW and the GGSN over the Gn interface and between the MGW and RNC over the Iu interface following the GTP-U specification, cf. the 3GPP document referred to above. Through splitting up an SGSN into an SGSN server node and an MGW, there will only be a functional impact on the SGSN itself and RNCs, GGSNs and other SGSNs as well as the protocols that are used between these nodes are not affected by the decomposition. Besides the Mc interface between the SGSN server and MGW, no other interfaces are impacted. The SGSN server node is a main control node for UMTS (and GPRS). It handles all the signalling interfaces of a 3GPP release 1999 SGSN including the GTP-C protocol on the Gn and Gp interfaces and the RANAP protocol on the Iu interface. The SGSN server controls the media gateway through the Mc interface following the H.248 Standard. The SGSN server supports the Iu interface for UMTS and, in one implementation, the Gb interface for GPRS for GSM.

The MGW handles the user plane functionality for GPRS and terminates the GTP-U tunnels towards the GGSN over the $G_N$ and $G_P$ interfaces and towards the RNC over the Iu interface. The MGW is controlled by the SGSN server through the Mc interface following the H.248 standard. For UMTS the MGW is controlled by the SGSN server through the Mc interface supporting the H.248 protocol with the GRPS specific extensions, the Iu interface between the RNC and the SGSN server supports the RANAP protocol. Mc and RANAP belong to the control plane as well as the Iu interface between the RNC and MGW which supports the GTP-U protocol. In UMTS the Gn interface between the SGSN server node and the GGSN supports the GTP-C protocol and belongs to the control plane. As referred to earlier, the protocols and the terminology can be found in 3GPP, 3G TS 23.060 which was incorporated herein by reference thereto.

The inventive concept also covers an implementation in which FSN:s (SGSN servers) are provided in one or more pools but in which there are no UGN:s, i.e. no nodes or means handling user plane functionalities which might not be necessary for packet switched data. For circuit switched traffic, such nodes are however generally needed, RNC:s then communicate directly with FSN:s.

Figure 3:
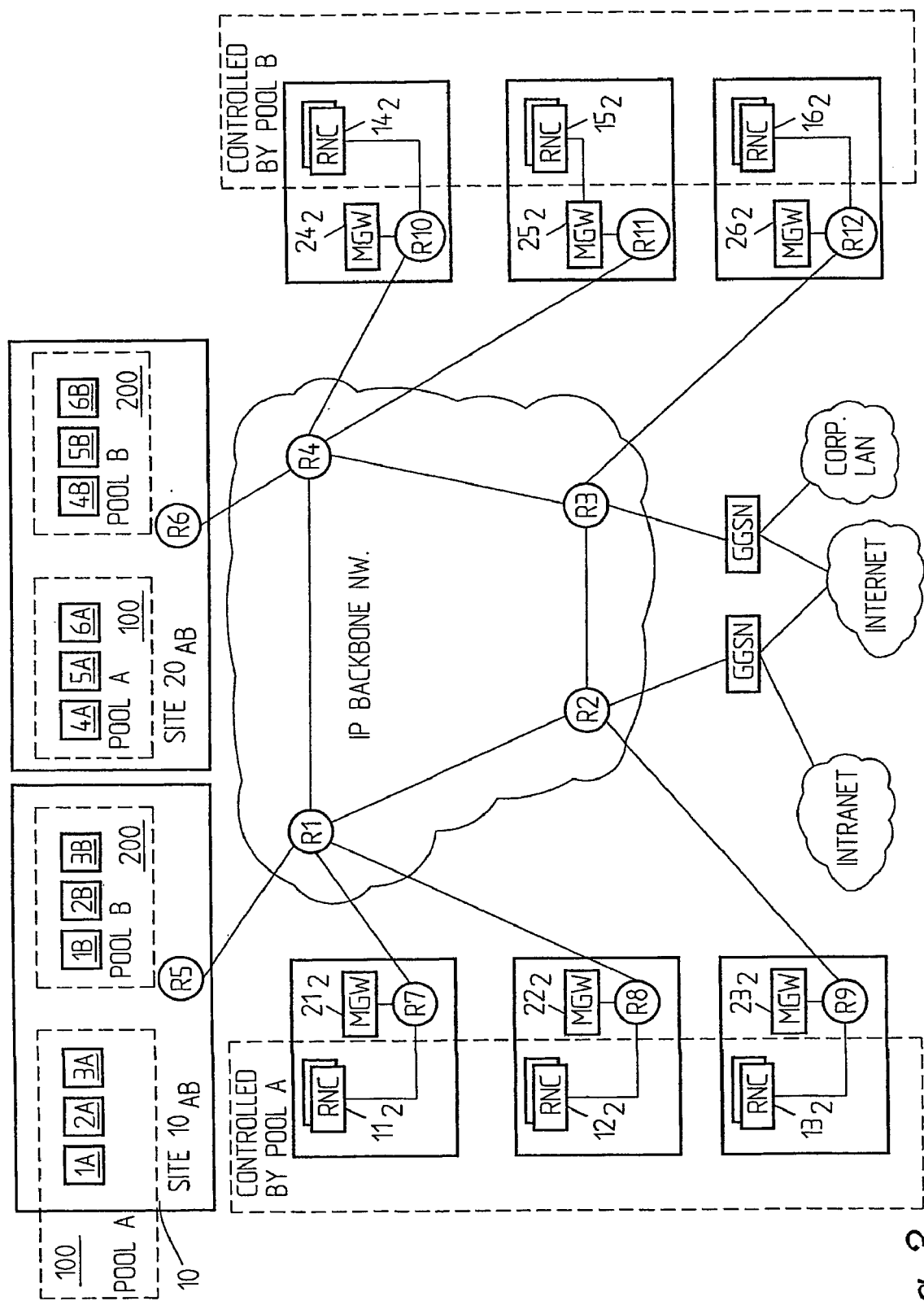
FIG. 3 illustrates an alternative implementation with two pools with functional server means, FIG. 4A schematically illustrates the attach procedure in sequential steps, FIG. 4B schematically illustrates the PDP Context activation procedure in sequential steps.

FIG. 3 shows an alternative implementation of the inventive concept. It is here discussed with reference to UMTS, but it should be clear that it is generally applicable to any system and particularly any system wherein the protocol between the radio network and the packet data support node can be divided between control plan functionalities and user plan functionalities.

SGSN server nodes are provided in two different pools, pool A 100 and pool B 200 respectively. The functional server nodes, particularly SGSN server nodes 1A,2A,3A of pool A 100 are located at site 10$_{AB}$ whereas functional server nodes 4A,5A,6A of pool A 100 are located at site 20$_{AB}$. Correspondingly functional server nodes 1B,2B,3B of pool B 200 are located at site 10$_{AB}$ whereas functional server nodes 4B,5B,6B of pool B 200 are located at site 20$_{AB}$. Functional server means of one and the same pool are located at different sites for reasons of redundancy in case a site is destroyed due to sabotage, fire, or is out of operation for some other reason, RNCs 11$_2$,12$_2$,13$_2$ are here controlled by pool A whereas RNCs 14$_2$,15$_2$,16$_2$ are controlled by pool B. In this embodiment all media gateways 21$_2$,22$_2$,23$_2$, 24$_2$, 25$_2$,26$_2$ are connected to routers R7,R8,R9,R10,R11,R12 respectively enabling the use of redundant media gateways as also discussed with reference to FIG. 2. It should be noted that MGW 25$_2$ is connected both to RNC 15$_2$ and to R11, which is an alternative that also could be represented elsewhere, of course R11 might be connected as e.g R10. In other aspects the figure is similar to those of FIG. 1, FIG. 2.

It is possible to, instead of one pool at two sites (here FIG. 1, FIG. 2), or two pools sharing two sites, have one pool at one site only; however then redundancy is not as good, or two pools at only one site, three pools sharing two sites or three sites or any other convenient constellation. In a particular implementation two or more sites are co-located but still separate. Alternatively two sites may have entirely different locations.

It is common for all embodiments that the number of FSN:s (SGSN servers) can be changed arbitrarily without affecting the network structure. Particularly if the number of subscribers increases, simply more FSN:s (SGSN servers) are added—there is no need to add UGN:s (MGW:s), RNC:s, BS:s etc which is extremely advantageous.

Figure 4A:
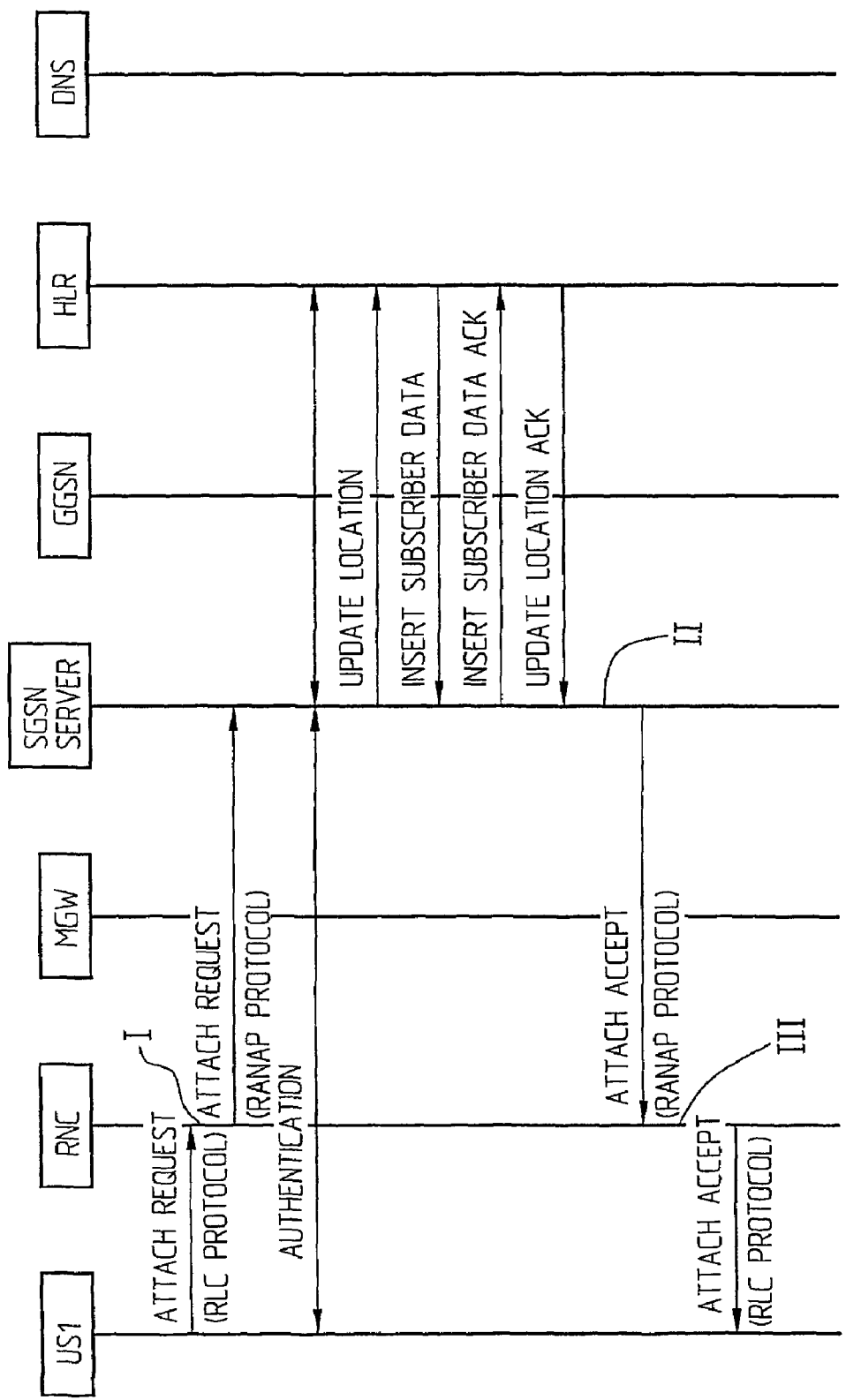

FIG. 4A shows an example on attach procedure when the inventive concept is implemented. An attach request is sent from US1 to RNC on the RLC (Radio Link Control) protocol. I indicates the SGSN server selection procedure as further described e.g. with reference to FIG. 5A. When a SGSN server has been selected, the attach request is sent on to SGSN server using the RANAP protocol. Thereon follows an authentication procedure, e.g. in a conventional manner (cf. 3G TS 23.060 V.3.4.0 (2000-07). Subsequently steps relating to location updating including insertion of subscriber data and finally an Update Location Acknowledgement is sent to the selected SGSN server. After this step a new P-TMSI (Packet TMSI) is allocated, illustrated by II in the Figure. Then follows an Attach Accept from SGSN server to RNC on the RANAP protocol. At reception of Attach Accept in RNC, information about the new P-TMSI and selected (and accepting) SGSN server is stored in RNC (III). Finally an Attach Accept is sent to US1 using the RLC-protocol.

Figure 4B:
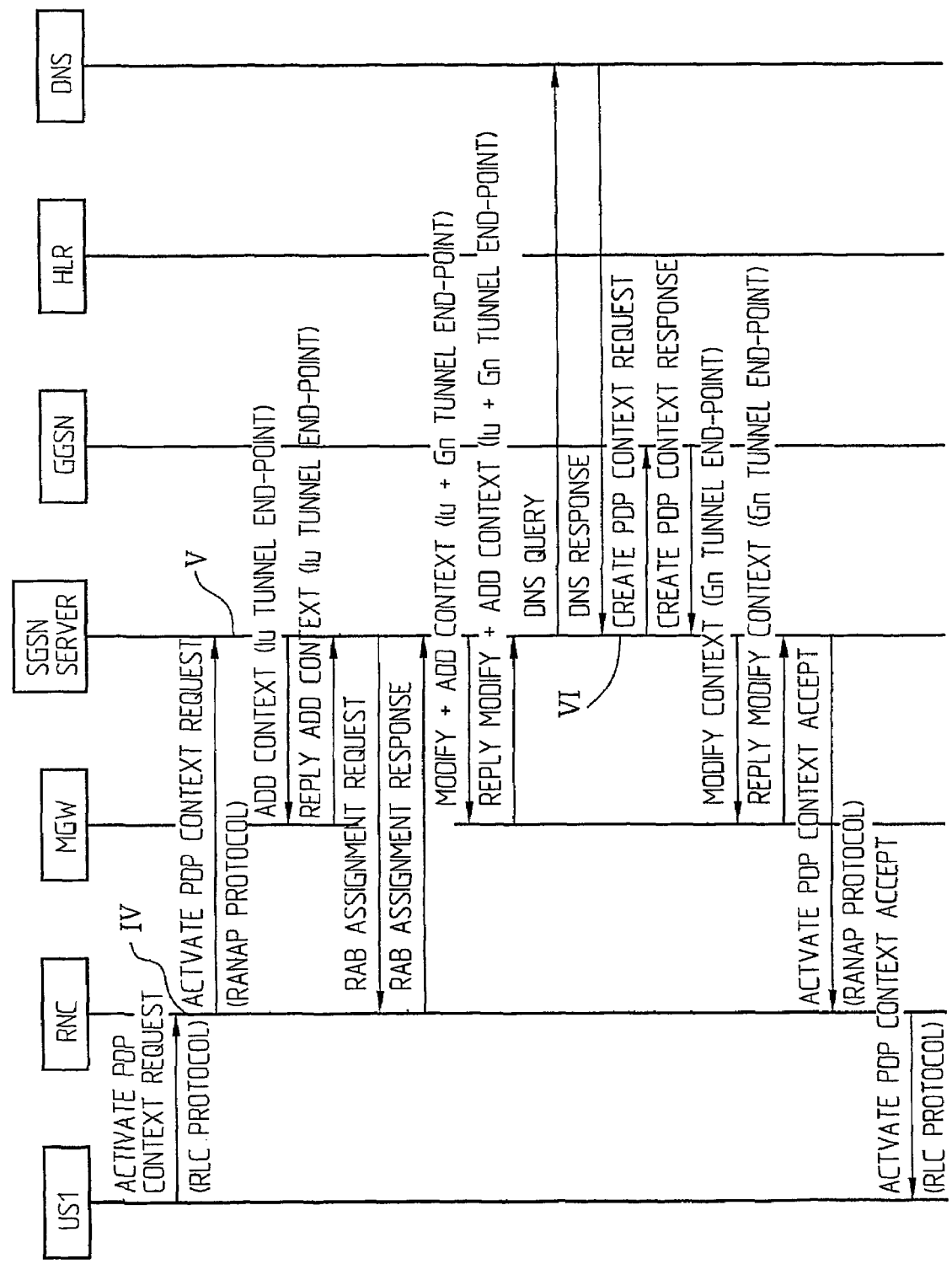

FIG. 4B illustrates an example on PDP Context Activation procedure when the SGSN pool server concept according to the invention is implemented. An Activate PDP Context Request is sent from US1 to RNC using the RLC protocol. At that stage, cf. IV in FIG. 4B, an SGSN server lookup is performed. This is further described in FIG. 5B below. If there is information about which is the selected (and accepting) SGSN server, the Activate PDP Context Request is sent on to the selected (looked up) SGSN server using RANAP. Then a MGW selection is performed, this is further described with reference to FIG. 6. SGSN server then sends an Add Context for Iu tunnel end-point to MGW, which returns Reply Add Context with Iu tunnel end-point to SGSN server.

Then follows RAB (Radio Access Bearer) Request from SGSN server to RNC, and corresponding response. Subsequently SGSN sends a modify Context Iu tunnel end point and add Context for Gn tunnel end point request to MGW, which returns a response to SGSN server. Thereafter SGSN server sends a DNS query to DNS (Domain Name Server), and following on the response, a GGSN may be selected, VI. How this can be done is further discussed in FIG. 7 below. Subsequently a Create PDP Context Request is sent to the selected GGSN which returns a response to SGSN server. A Modify Context message (with Gn tunnel end-point) is sent to MGW, which confirms to SGSN server. Finally an Activate PDP Context Accept is sent from SGSN server to RNC using RANAP. An activate PDP Context Accept is forwarded from RNC to US1 using the RLC-protocol.

The order in which tunnel end points are added and modified in MGW can be different.

Figure 5A:
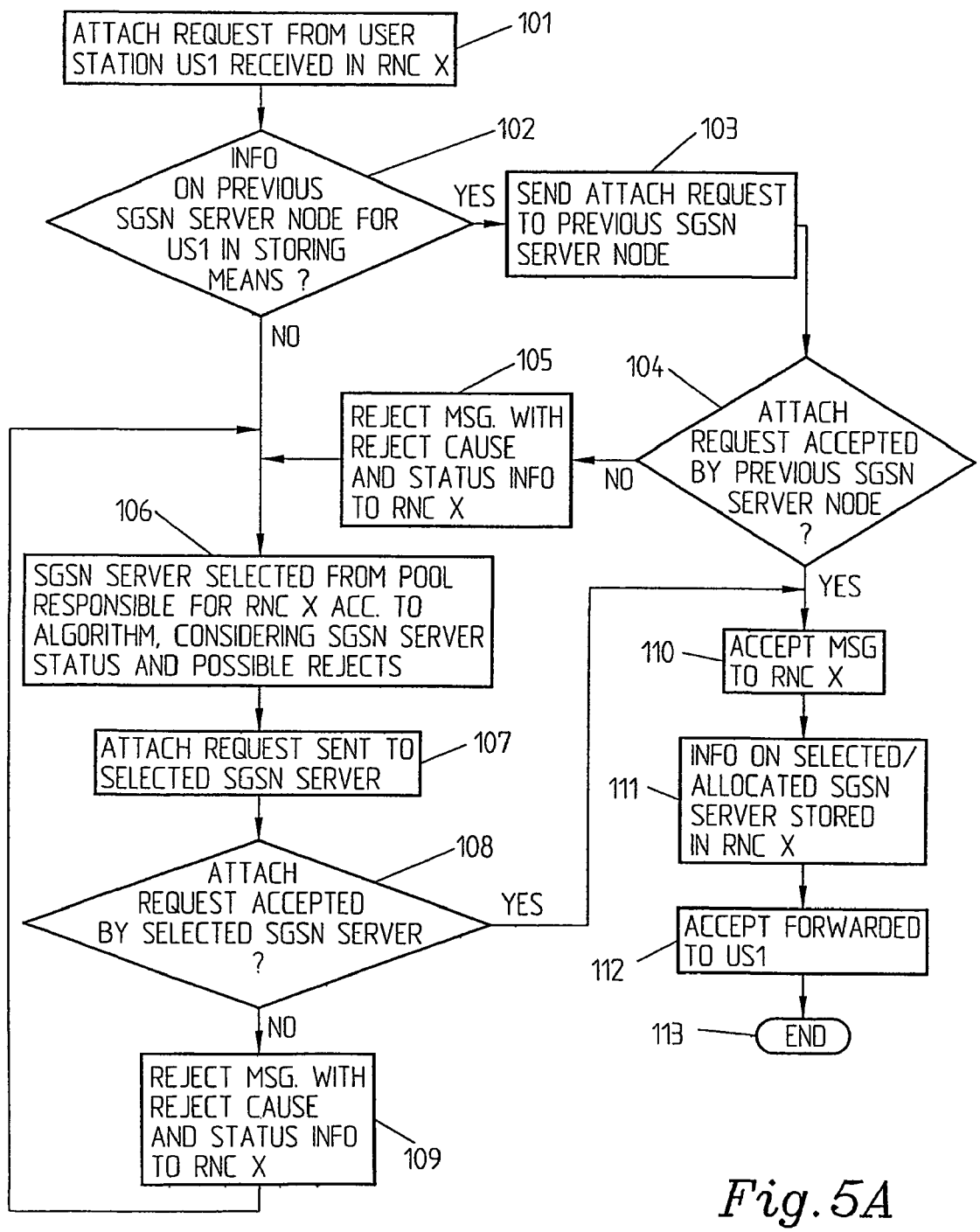
FIG. 5A is a flow diagram schematically illustrating one way to select a functional server node from a radio network control means and the attach procedure.

In the flow diagram of FIG. 5A the selection of an SGSN server node as initiated by an attach request is described, particularly relating to the UMTS system and according to one implementation. First it is supposed that an attach request from a user station, here denoted US1, is received in RNC X, 101. RNC X checks in storing means if there is any information about a recently used SGSN server node for US1, generally the most recently used SGSN server, 102. If the storing means contains such information, the attach request is sent on by RNC X to the previous SGSN server node, 103. It is then established if the "previous" SGSN server accepts the attach request, 104. If not, a reject message is sent to RNC X, 105. In a preferred implementation the message contains information about why the request is rejected and about the status of the "previous" SGSN server. In an alternative implementation the SYSN server stored as "previous" SYSN server does not have to be used, but other SYSN servers can be used, e.g. to take load situation into account, even if then more signalling is needed. If a reject is received from SGSN server, then RNC X selects a SGSN server from the pool responsible for RNC X, e.g. using an algorithm, such as WRR taking SGSN server status and possible rejects into consideration, 106. An attach request is then sent to the selected SGSN server, 107. If the attach request is not accepted, the selected SGSN server sends a reject message, preferably with information about the reason for the rejection and about status, to RNC X, 109, similar to step 105 discussed above. A new SGSN server is then selected, and the procedure is repeated as from step 106 and onwards, preferably until the attach request is accepted.

The intelligence for making such decisions may reside in SGSN server using a reject mechanism to trigger the selection of a new SYSN server.

The sending of reject messages need not be compulsory; in an alternative implementation a new SGSN server is selected unless an acceptance is received, or if the selection is completed (attach request confirmed) within a predetermined time interval. Various alternatives are possible for settling that a selection was not successful. If, on the other hand, the selected SGSN server node accepts being selected, the selection/allocation is completed, 110, and an accept message is forwarded to RNC X, 110. The information on selected/allocated SGSN server is then stored in RNC, 111. From RNC the accept message is forwarded to US1, 112, and then the selection and attach procedures are completed, 113.

Figure 5B:
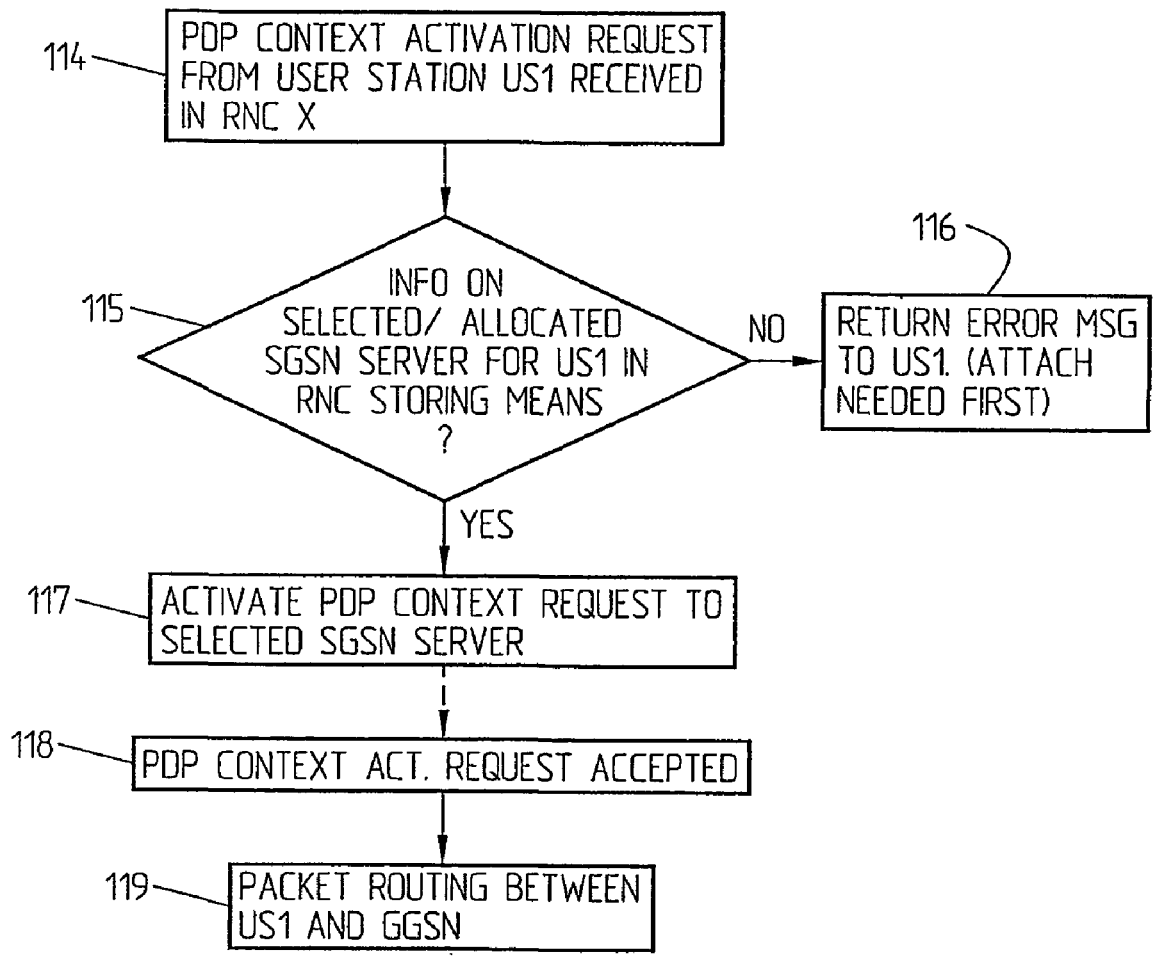
FIG. 5B illustrates a PDP Context activation procedure.

FIG. 5B illustrates the reception in RNC X of a PDP Context Activation request from US1, 114. (The PDP Context Activation procedure is described in 3GPP TS 23.060 as referred to earlier in this document.) It is examined if there is any information on selected/allocated SGSN server for US1 in the storing means of RNC X, 115. If not, an error message is returned to US1, 116. The reason will presumably that no attach procedure has been done/completed. If information is contained in the RNC X storing means, the activate PDP Context Request from US1 is sent on to the selected SGSN server by RNC X, 117. After a signalling procedure e.g. as disclosed in the above mentioned document, (illustrated through a dashed line), the PDP Context Activation request is accepted, 118.

During the procedure of activating a PDP Context Request, a MGW is selected by the SGSN server node. If no MGW:s are implemented, a tunnel may instead be set-up directly to the appropriate GGSN. Finally packets can be routed between US1 and GGSN, 119.

Figure 6:
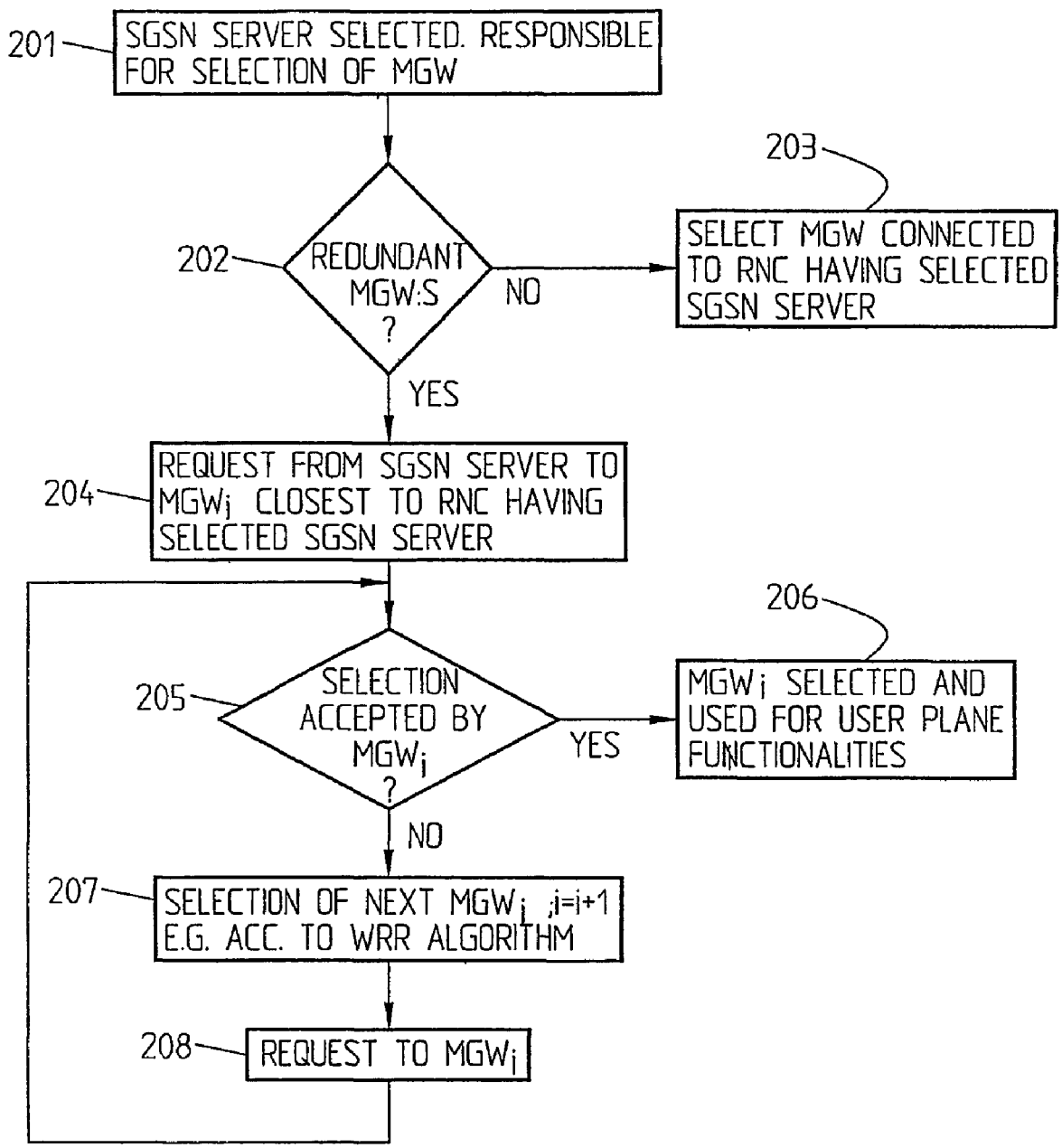
FIG. 6 is a schematical flow diagram illustrating the selection of a user gateway node from a functional server means.

FIG. 6 illustrates the procedure of selecting MGW, which preferably is the responsibility of the selected SGSN server (on condition that MGWs are actually implemented), 201. The selection takes place between steps 117, 118 of FIG. 5B.

A step, 202, may be included to establish if there actually are redundant MGWs. If not, the MGW which is connected to the RNC having selected the SGSN server is "selected", 203. If, however, redundant MGWs are implemented, a request is sent from the selected SGSN server to the $MGW_i$, that is closest to the RNC having selected the SGSN server, 204. Subsequently it is established if the selection is accepted by $MGW_i$, 205. If yes, $MGW_i$ is selected and used for user plane functionalities. If on the other hand $MGW_i$ does not accept the selection, the SGSN server selects the next $MGW_i$, i=i+1 according to a scheme or an algorithm, e.g. WRR as discussed with respect to SGSN server selection. Reject messages with or without accompanying information may be sent from $MGW_i$ to SGSN server. Also sending of accept messages may be implemented. A new request is then sent to the subsequent $MGW_i$, wherein i=i+1, 208. The procedure is particularly repeated from step 205 until a $MGW_i$ is found that accepts being selected.

Figure 7:
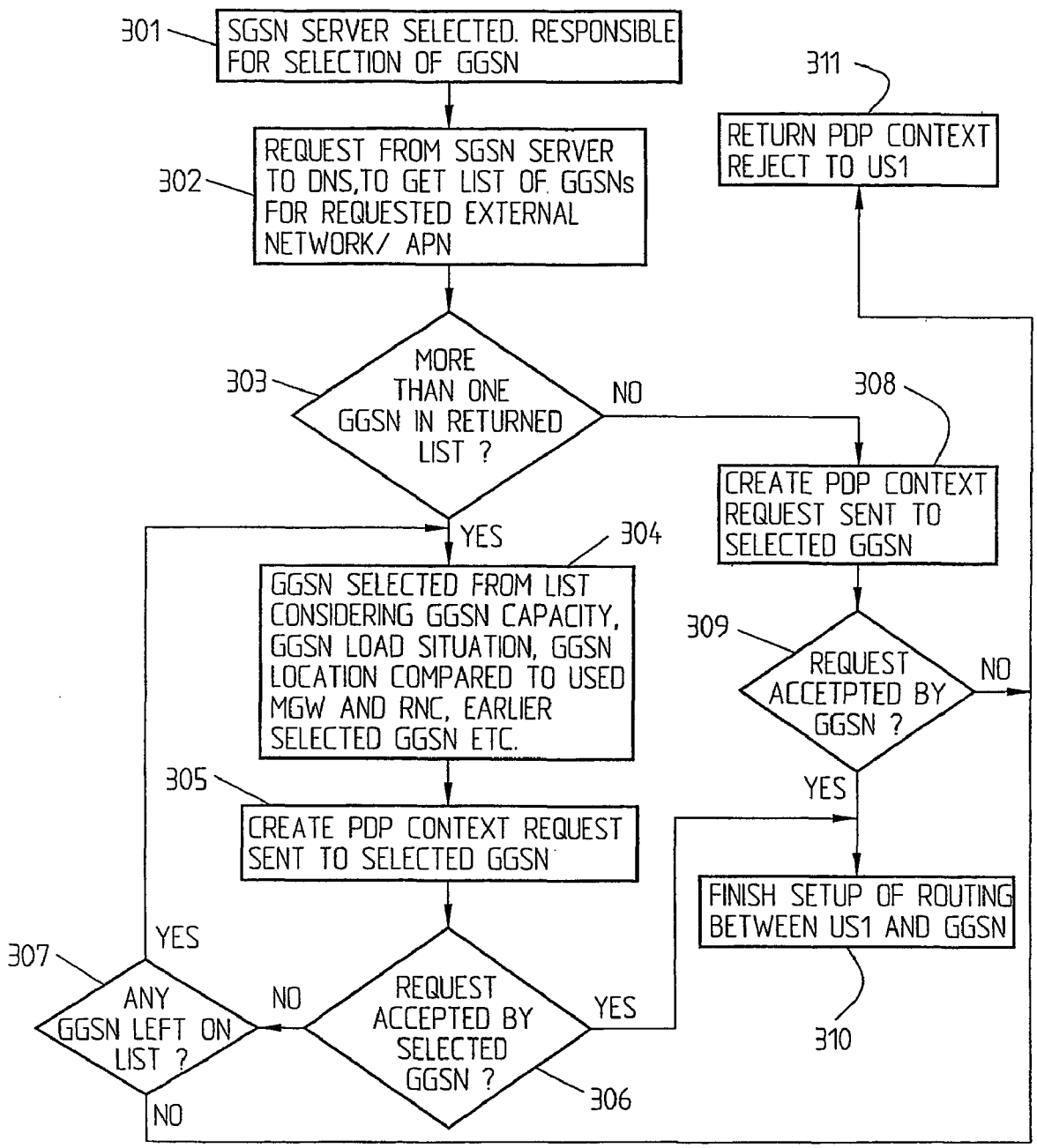
FIG. 7 is a flow diagram schematically illustrating selection of gateway support node, GGSN, by the functional server node, SGSN server node.

FIG. 7 relates to selection of GGSN according to a particular embodiment in which the selected SGSN server is responsible for selection of GGSN, 301. A request is sent from SGSN server to DNS (Domain Name Server) to get a list of GGSNs for the requested external network/APN, 302. Subsequently it is checked if there are more than one SGSN on the returned list, 303. If not, a create PDP Context Request is sent to the "selected" GGSN, 308. It is then examined if GGSN accepts the request, 309. If yes, the routing setup between US1 and GGSN is finished, or completed, 310, and an activate PDP Context accept is returned to US1. Otherwise a PDP Context Reject is returned to US1, 311. If it, on the other hand, is established that there are more than one GGSN:s on the list, a GGSN is selected from the list taking into consideration GGSN capacity, GGSN load situation, GGSN location compared to used MGW and RNC, earlier selected GGSN etc., 304. When a GGSN thus has been selected, a create PDP Context Request is sent to it, 305. It is examined whether the request is accepted or not, 306. If yes, the routing setup between US1 and GGSN is finished, 310, and then an activate PDP Context accept is returned to US1. If not, it is checked if there is any GGSN left on the list, 307. If not, a PDP Context Reject is returned to US1, 311. If there still is one (or more) GGSN(s) left on the list, is returned to step 304, etc.

It should be clear that the invention is not limited to the illustrated embodiment but it may be varied in a number of way within the scope of the appended claims, particularly FSNs may be provided in one or more pools (at one or more sites), UGNs may be implemented or not (for packet based communication). If UGNs (MGWs) are used, they may be selected in any conventional manner, or according to the procedures as discussed herein. The selection of SGSN may also be done in a conventional manner, or as disclosed herein. Particularly, as an alternative, selection of SGSN server (FSN) may be completed before any attach request is forwarded from RNC through separate signalling, and not until an accept has been received by RNC (or e.g. when a time interval has expired) the attach request is sent on to the selected FSN (SGSN server) having accepted being selected.

What is claimed is:

1. A communication system supporting communication of packet data within a packet data network, comprising:
   a core network further comprising
      a plurality of packet data support nodes; and
      a plurality of gateway nodes for communicating with external packet data networks;
   a plurality of radio networks wherein each radio network includes means for controlling said each radio network;
   wherein some of said plurality of packet data support nodes further comprises a plurality of functional server nodes forming a common pool and wherein each of said functional server nodes within said common pool is able to be associated with and control any of said means for controlling said each radio network; and
   wherein each of said means for controlling radio networks further comprises means for performing an attach procedure to attach a particular user station to a particular one of said plurality of functional server nodes independent of the location of said user station and unaffected by the roaming of said user station.

2. The communication system of claim 1 wherein said plurality of function server nodes are formed into two or more common pools wherein each common pool controls an assigned part of said packet data network and wherein each function server node within a particular pool is able to be associated with and control any of said means for controlling said each radio network within said assigned part of said packet data network.

3. The communication system of claim 1 wherein said packet data network comprises a public land mobile network (PLMN) and said common pool of function server nodes are able to serve said entire PLMN.

4. The communication system of claim 1 wherein said means for controlling said each radio network includes a radio network control (RNC) node communicating with a functional server node over a control plane subprotocol.

5. The communication system of claim 1 comprises a General Packet Radio Service (GPRS) wherein said functional server nodes are Serving GPRS Support Node (SGSN) and wherein said GPRS comprises media gateway nodes (MGW).

6. The communication system of claim 1 wherein said means for performing said attachment selects a particular one of said functional server node within said common pool to evenly distribute the capacity within said common pool.

7. The communication system of claim 1 wherein the attachment of said user station to said particular function server node is maintained at least for a given time period.

8. The communication system of claim 1 wherein said means for performing said attach procedure further comprises a record for storing information about which particular user station is attached to which functional server node such that in the event said user station is detached from said functional server node and then re-attempts to attach to said communication system, said means for performing said attach procedure re-attaches said user station with said same functional server node as indicated by said record.

9. The communication system of claim 8 wherein said user station is re-attached to said function server node regardless of which radio network control means is now serving said user station.

10. The communication system of claim 1 wherein each of said functional server nodes further comprises means for accepting or rejecting an attach attempt associated with said attach procedure performed by a particular means for controlling said radio network.

11. The communication system of claim 1 wherein said plurality of packet data support nodes further comprise a plurality of user gateway nodes and wherein each of said functional server node comprises means for selecting a particular one of said plurality of user gateway nodes for each user station attached to said each functional server node.

12. The communication system of claim 1 wherein each of said functional server node selects a user gateway node closest to a radio network serving a particular user station.

13. A method of providing communication within a communication system including a core network and a number of radio networks providing radio connection to a plurality of user stations, wherein said core network further includes packet data support nodes, comprising the steps of:
   providing a plurality of functional server nodes within said packet data support nodes into a common pool;
   receiving a request from a particular user station to attach to said communication system by a particular radio network serving said user station; and
   selecting, by said radio network, a particular one of said plurality of functional server node irrespective of said location associated with said user station or said radio network such that even distribution of overall network capacity can be performed within said plurality of functional server nodes for said plurality of user stations being served by said communication system, wherein the step of selecting a particular one of said plurality of functional server node includes performing an attach procedure to attach a particular user station to a particular one of said plurality of functional server nodes independent of the location of said user station and unaffected by the roaming of said user station.

14. The method of claim 13 wherein said step of selecting selects a different functional server node for consecutive user stations performing a network attach procedure.

15. The method of claim 13 wherein said packet data support nodes further include a plurality of user gateway nodes, further comprising the step of said functional server node selected for a particular user station further selecting a particular one from said plurality of user gateway nodes.

16. The method of claim 13 wherein said communication network further includes a plurality of gateway support node, further comprising the step of said functional server node selected for a particular user station further selecting a particular one of said plurality of gateway support nodes for communicating with an external packet data network.

17. The method of claim 13 wherein in the event a particular user station is attached to a particular functional server node and then has been de-attached from said communication network, further comprising the steps of:
   receiving a request from said user station to attach to said communication network;
   identifying said functional server node previously attached to said user station; and
   re-attaching said user station to said same functional server node.

18. A packet data communication system including a core network and a plurality of radio networks associated with said core network wherein said core network further includes a plurality of functional server nodes and wherein said plurality of radio networks provides radio coverage to a plurality of user stations within a particular network coverage area, comprising:
   means for receiving a request from a particular one of said user stations to attach to said packet data communication system; and means for selecting a particular one of said functional server nodes to be attached to said user station wherein said means for selecting is able to select any one of said functional server nodes without considering the location of said user station or the location of said means for selecting within said packet data communication system and wherein no one particular functional server node is pre-assigned to said means for selecting;

wherein said means for selecting a particular one of said functional server nodes includes means for performing an attach procedure to attach a particular user station to a particular one of said plurality of functional server nodes independent of the location of said user station and unaffected by the roaming of said user station.

19. The packet data communication system of claim 18 further comprising means for storing the identity of a particular functional server node attached to said user station and in the event said user station is de-attached and then attempts to re-attach to said packet data communications system, said means for selecting selects said same functional server node previously attached to said user station by accessing said means for storing.

20. The packet data communication system of claim 18 wherein said means for selecting selects particular ones of said functional server nodes to evenly distribute the capacity associated with handling data communicated with said plurality of user stations within said packet data communication system.

* * * * *